Figure 7:
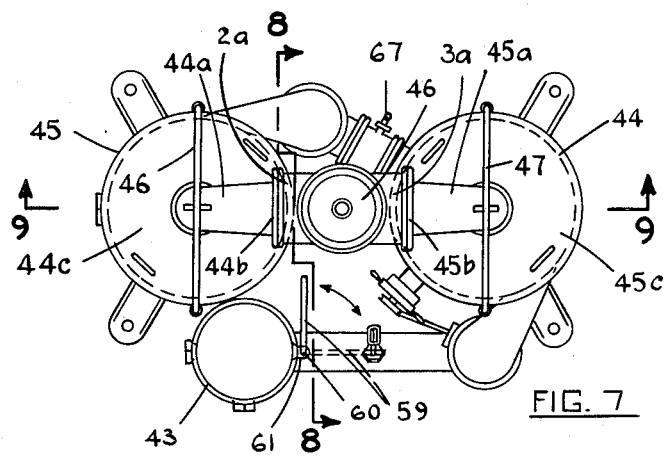

Feb. 8, 1955          H. L. MURRAY                    2,701,681
                    EJECTOR CONDENSER
Filed Aug. 16, 1949                              5 Sheets-Sheet 1
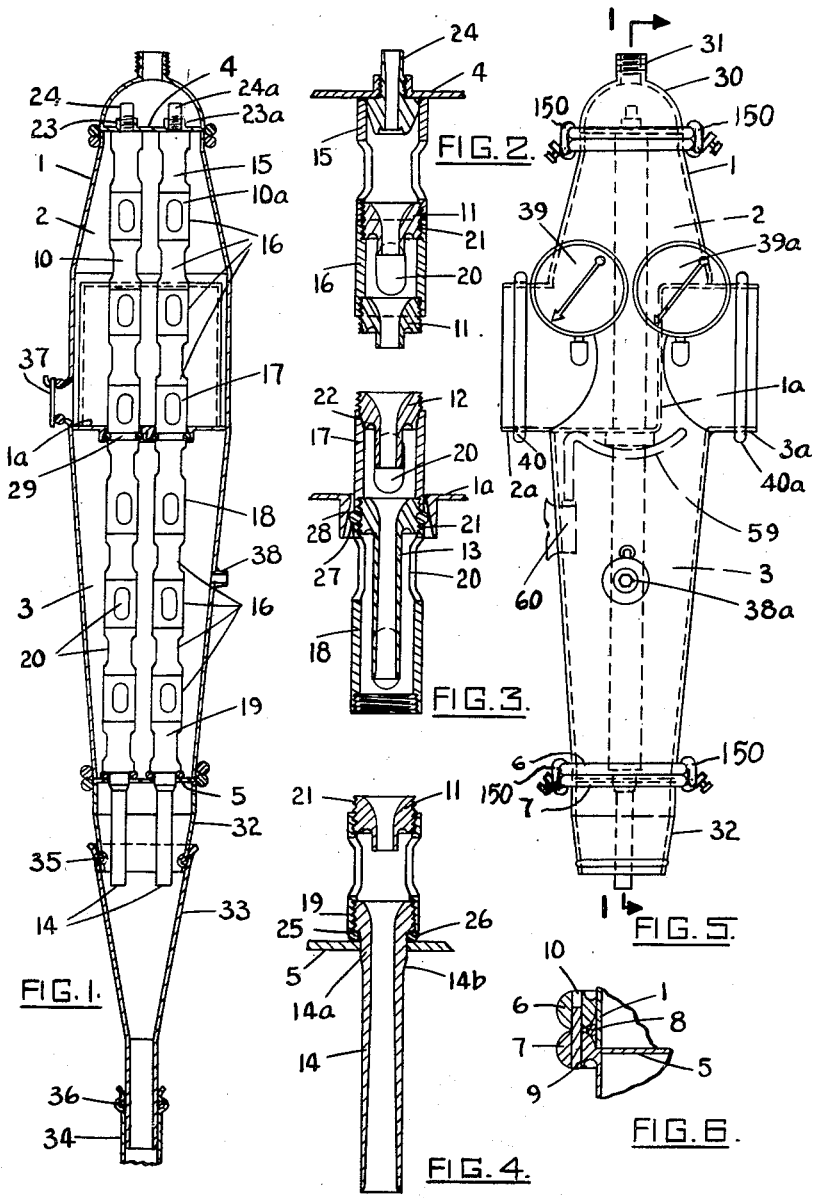
INVENTOR.
HENRY LAMONT MURRAY,
BY
Henderoth, Lind & Ponack
ATTORNEYS Feb. 8, 1955 H. L. MURRAY 2,701,681
EJECTOR CONDENSER
Filed Aug. 16, 1949 5 Sheets-Sheet 2

INVENTOR.
HENRY LAMONT MURRAY,
BY
Wenderoth, Lind & Ponack
ATTORNEYS

Feb. 8, 1955  H. L. MURRAY  2,701,681
EJECTOR CONDENSER
Filed Aug. 16, 1949  5 Sheets-Sheet 4
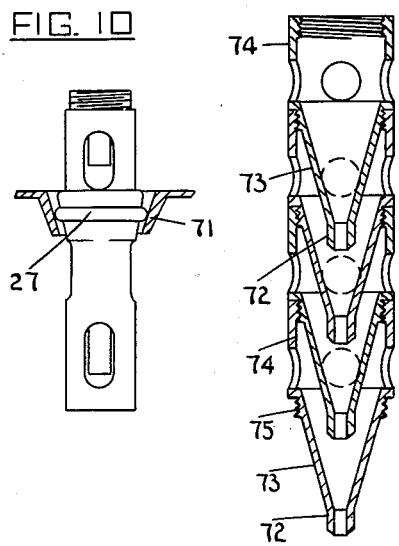
FIG. 10
FIG. 11
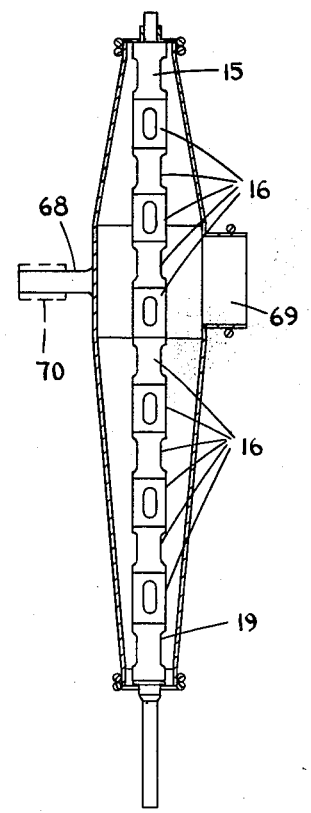
FIG. 12
INVENTOR.
HENRY LAMONT MURRAY,
BY
Wenderoth, Lind & Ponack
ATTORNEYS Feb. 8, 1955

H. L. MURRAY 2,701,681

EJECTOR CONDENSER

Filed Aug. 16, 1949

5 Sheets-Sheet 5

INVENTOR.
HENRY LAMONT MURRAY,
BY
Wenderoth, Lind & Ponack
ATTORNEYS

United States Patent Office 2,701,681
Patented Feb. 8, 1955

2,701,681

EJECTOR CONDENSER

Henry Lamont Murray, Parnell, Auckland, New Zealand, assignor to Murray Deodorisers Limited, Auckland, New Zealand Application August 16, 1949, Serial No. 110,516

Claims priority, application New Zealand August 25, 1948

26 Claims. (Cl. 230—103)

The present invention relates to ejector condensers of the type which essentially comprise a closable shell or body portion enclosing one or more independent vapour zones with the requisite vapour inlet or inlets thereinto, said shell containing one or more columns or passage ways provided with a series of spaced throats, each passage way being operatively associated with said zone or zones and with an inlet nozzle adapted to direct a vacuum-creating medium such as water under pressure from outside said shell through said passage way or passage ways for discharge outside the said shell, thus enabling the condenser to function. Such a type of apparatus is disclosed, for instance, in United States Letters Patent Nos. 2,314,455 and 2,378,425.

An ejector condenser according to the present invention is admirably suited for use in combination with hygienic apparatus for pasteurizing, vacuum steam distilling, de-aerating, vacuum cooling, vacuum concentrating and such like treatment of lacteal liquids, mixtures containing lacteal liquids, ice-cream mixtures, fruit and vegetable juices, syrups, egg pulp, wort, beverages, organic oils and fats, and such like foods intended for human consumption, concerning the treatment of which it is most desirable that the whole construction of the apparatus and its ease of cleaning and sterilizing shall conform to the highest official sanitary standards.

It may be noted that in many arts wherein vacuum equipment is required, it is essential that a high degree of sterility of the apparatus be obtained prior to the operation of the apparatus, and this, not only for a single run, but for each repeated run or separate usages of the vacuum apparatus. This prerequisite obtains, or should obtain, in many arts, regardless of the vacuum level or capacity required.

Where, by way of illustration, the material to be treated in the vacuum apparatus is intended for human consumption, it is evident that the whole apparatus in which the material is subjected to the vacuum processes should be of a type which can be readily and frequently subjected to sterilization.

Now, while various vacuum pumping means are known, deserved popularity has attended upon the introduction of the so-called ejector-condenser evacuating means into the art. Its popularity and widespread acceptance is deserved, in part by reason of its basic simplicity as compared with other evacuating apparatus; as well as because of its comparative sturdiness in use, and economy of operation. Little attendance is required. Thus, in vacuum processing operations, where required degree of sterility of the apparatus interposes no problem, the ejector-condenser commonly supplies a most satisfactory solution to the question of what vacuum pumping means to employ.

Where, however, the maintenance of a high degree of sterility of the apparatus is an essential prerequisite, known ejector-condenser equipment has the grave disadvantage of impracticability of cleaning such equipment. This defect has been properly attributable in large measure to the complex nature of the several parts of the condenser, and to their essentially fixed relationship in assembly. For, while these condensers are simple in construction when measured by comparative standards and in contrast to other known vacuum-producing apparatus, complexity does attend upon such constructions when measured by absolute standards, and when considered in the light of the facility with which the operator may scour, clean out, and sterilize such apparatus. Apart from the considerable difficulty and time involved in dismantling such known condensers, a substantial number of points exist therein for entrapment of detrimental residues derived from the products undergoing treatment. These deposits serve as possible sources of contamination which may effect the product being processed. The difficulty of cleaning is even greater where multiple water jets are employed, or where the condenser is compound in nature, i. e., where it has two or more separate zones of vacuum which are created and sustained by the same ejector flow.

It is not enough, in undertaking to clean the condenser, simply to wash it through with steam or hot water. Experience has disclosed that the solid particles are not removed or disposed of in satisfactory manner by such treatment. The deposit remains and this furnishes a constant source of possible contamination of the product undergoing treatment in the apparatus in which the condenser is embodied. The very purpose of such treatment thus is frequently defeated at the very outset. Hand cleaning of the ejector-condenser is required if sterility of the apparatus is to be achieved.

Further, in some arts, vacuum processing apparatus is employed for the purpose of extracting and collecting condensible volatile substances from the materials being treated. Such arts, in the main, have heretofore been unable to avail themselves of the known advantages of ejector-condensers for the reason that the volatile substances would be lost in the contaminated water which issues from known types of ejector-condenser.

Also, in certain other arts, where controlled vacuum processing methods could prove beneficial, such treatment has heretofore not been practicable, owing to the loss of volatile substances which would result—unless uneconomic means were employed to prevent same.

Inasmuch as the great advantages of the use of ejector-condensers in the vacuum processing of food or other products where substantially sterile conditions were requisite have for many years been realised, a great deal of time, research and expense have naturally been directed to overcoming the already mentioned difficulties which have heretofore precluded the general use of ejector condensers in the said arts.

As a result of wide and intensive research work, the present invention for the first time, it is confidently believed, has produced a sanitary ejector condenser which not only enables many arts to benefit from the employment of the principles embodied in ejector condensers, but also makes practicable the employment of vacuum processing methods by those arts which have heretofore been unable to do so. This is because of the hygienic character of such sanitary ejector-condenser, and its suitability for construction from substantially non-oxidizable materials.

Another important feature of the invention is the feature of adjustability which makes possible for the first time highly economical operation within a wide range of duty. In known types of ejector-condensers, the capacity of any one unit is substantially fixed by the area of the liquid jet or jets which operate it. In such condensers the fixed nozzles and stacks of cones are substantially permanent as to the areas of their orifices, and condenser capacity can only be altered within the limits imposed by permissible changes of pressure and/or temperature of the actuating condensing liquid.

When known ejector-condensers are used for duty loads below their full capacity, a larger amount of actuating liquid is consumed than should be necessary, thus involving excessive consumption of such liquid, and also in most cases, of power used in pumping the liquid through the condenser.

Furthermore, where such known ejector-condensers are incorporated in, or used in association with, vacuum processing apparatus, the top capacity of such apparatus is limited to the maximum capacity of said condenser means. It is, therefore, evident that for the efficient operation of ejector-condensers or apparatus employing such means, the amount of operating liquid consumed at a given pressure and temperature should be that which will just comfortably handle the vapor and gas load and maintain the degree of vacuum demanded. In vacuum apparatus employing known ejector-condensers, it is generally well nigh impossible to increase the capacity of the apparatus by substituting a condenser unit of greater duty capacity than that originally supplied in or with the apparatus; also, it is quite impracticable to expeditiously change the duty capacity of such condensers by substituting alternative component parts therein, owing to the difficulty and tedium of dismantling, re-aligning and re-assembling same.

With this new sanitary ejector-condenser, the foregoing limitations are to an astonishing extent overcome, with the result that a vacuum processing apparatus employing it may be given great versatility and range of capacity by simply effecting a quick and convenient changeover of internal parts of the ejector-condenser. Thus, such apparatus may be employed economically within a wide range of duty, its condenser-duty-capacity being adjustable from run to run or from time to time. Apparatus equipped with this new sanitary ejector-condenser thus becomes of much greater utility, being suitable for a much wider range of application in the realm of vacuum treatment of foods destined for human consumption.

By the present invention, there is provided a jet condenser of the type described which can be readily dismantled and the passage way assembly or assemblies there within readily withdrawn for scouring and thorough cleansing, leaving the interior of the casing readily available for cleansing.

Further, the construction is such that such assembly or assemblies may be replaced by another or others more suited for the next function or operational use of the apparatus.

The ejector-condenser itself is in its preferred form so hingedly or pivotally connected to its associated apparatus that it may by releasing simple locking mechanism be swung into a convenient position for the withdrawal of the aforesaid passage way assembly or assemblies. Further, the condenser shell itself may be readily disassociated from or re-associated with its co-acting apparatus with a minimum of trouble and time.

In one aspect, therefore, the invention comprises an ejector condenser of the type described wherein the passage way or each passage way is supported in operative position within the shell without the necessity for attachment thereto so as to facilitate ready removal therefrom.

An object of the invention, therefore, is to provide a new vacuum pumping apparatus which has particular utility in the field of once-through vacuum flash pasteurization under admixture of steam.

Another object is to provide a new vacuum pumping apparatus which can be readily adapted for most efficient and economical operation for the particular vacuum demand made thereon.

Another object is to produce an ejector-condenser of the general type described which may be of single-jet or multi-jet type, either simple or compound stage, and which, in any of its many possible embodiments, may be readily dismantled for varied purposes, including adjustment for the particular vacuum demand thereon, for thorough scouring, cleaning and sterilizing; and thereafter, following such cleaning, may be readily re-assembled, all with a minimum of procedural steps, simple and rapid in themselves.

Another object is to provide an ejector-condenser which is extremely simple, sturdy, of comparatively low first cost and involving low maintenance, upkeep and repair costs; in which the several parts may be readily assembled and dismantled at the will of the operator; in which pumping device the several component parts co-operate with each other to insure both ready assembly and proper positioning during such assembly; and in which both the several component parts and assembly of parts are all of simple, regular and smooth contour, to facilitate cleaning and to prevent the formation and accumulation of zones of bacteria growth.

Still another object is to produce an ejector-condenser of either simple or compound type which can be readily mounted on and disassembled from its associated apparatus; which can be moved readily and bodily into clean-out position; and which involves a minimum of effort in removal of the condenser from, and assembly of the same with, the said related apparatus.

A final object is to produce a new once-through, continuous, vacuum-flash, steam-heat-treating apparatus, including an ejector-condenser, in which apparatus the ejector-condenser can be readily disassembled from its operable relationship with the remainder of the apparatus and readily and thoroughly scoured, cleaned and sterilized, all with a minimum of expenditure of time, labor and effort, and thereupon readily reassembled into the combination, in operable relationship therewith.

All these and many other highly practical objects and advantages attend upon the practice of the invention, which said additional objects and advantages will in part be obvious, and in part more fully pointed out during the course of the following description, taken in the light of the accompanying drawings.

Figure 8:
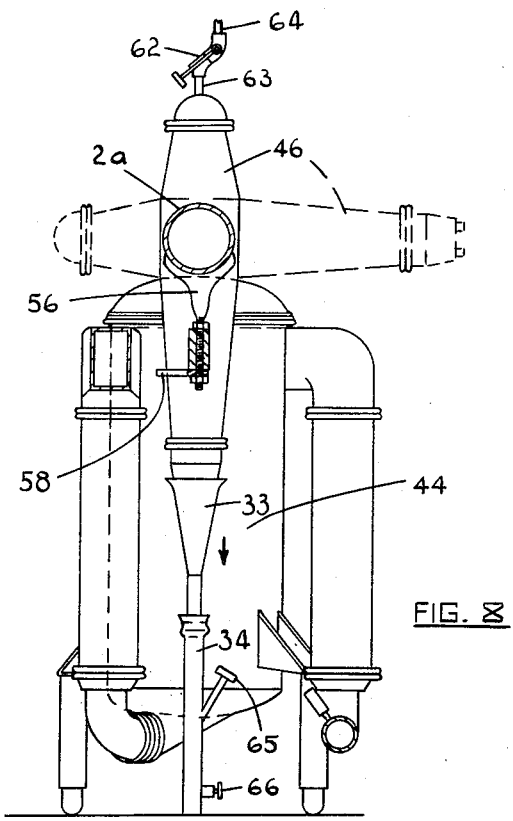
Figure 9:
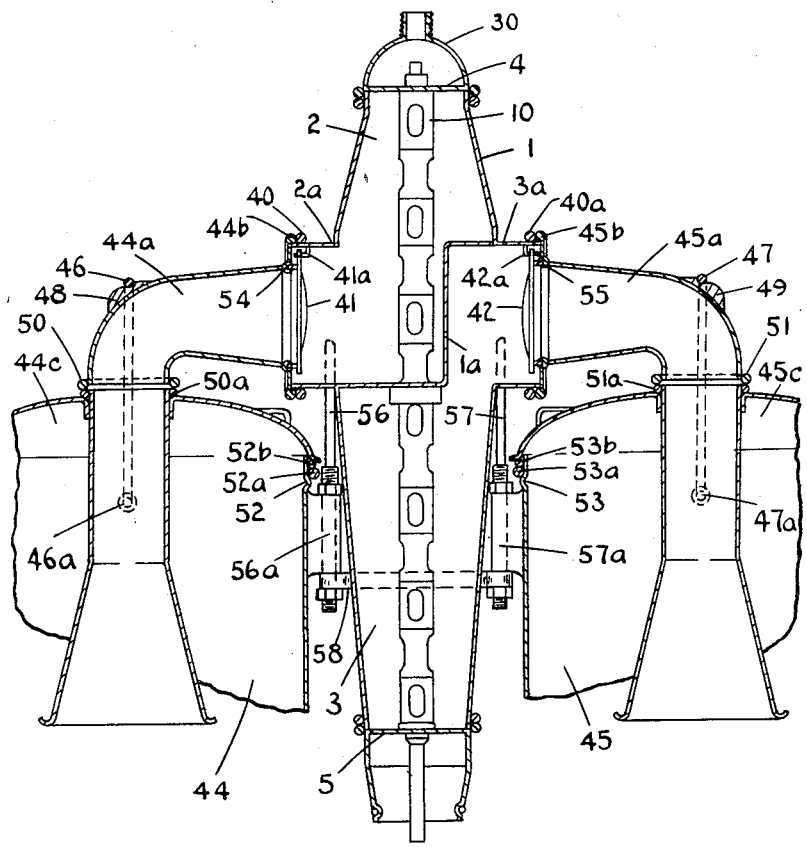
Figure 13:
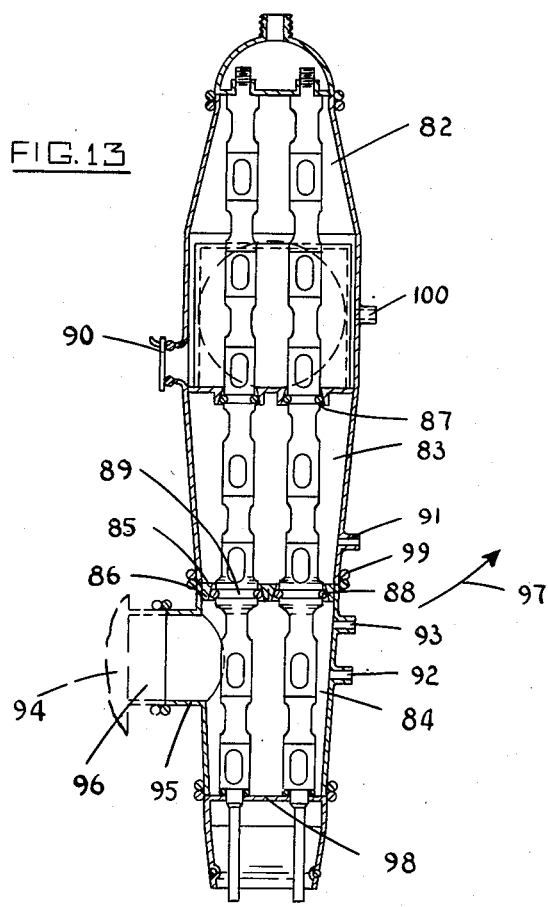

A preferred embodiment of the invention, and some modifications thereto, will now be described with reference to the accompanying drawings, in which:

Figure 1 is a vertical axial section, partly in elevation, through an ejector condenser according to the invention, in which the columns or passage ways can be withdrawn from the lower end of the condenser, the view being taken in the direction of the line 1—1, Figure 5, a telescopic drain funnel being also shown, Figures 2, 3 and 4 are vertical axial sections through one of the condenser columns, on the line 1—1, Figure 5, some of the parts of the column being omitted and the supply jet, part of the upper end cover, the intermediate column sealing means and the lower column sealing means being shown, Figure 5 is a front elevation of the ejector condenser shown in Figure 1, a snifter valve being shown and the position of a swivelling rest for supporting the condenser in horizontal position being shown in broken outline, Figure 6 is a detail sectional view, on a larger scale, through one of the joints in the shell, Figure 7 is a partly diagrammatic plan of a vacuum pasteurizing and steam distilling apparatus embodying the ejector condenser as shown in Figures 1 to 6, some of the parts being omitted for clarity, Figure 8 is a partly diagrammatic vertical section through such apparatus, on the line 8—8, Figure 7, some parts being omitted for clarity, the substantially horizontal clean-out position of the condenser being shown in broken lines, Figure 9 is a part section on the line 9—9, Figure 7, showing the relationship of the condenser with the two main chambers of the apparatus, said view also showing one-way flap valves to prevent back flow from the condenser, Figure 10 is an elevation of an intermediate part of a column as shown in Figures 1 to 4, an alternative arrangement of intermediate column seal being shown partly in section, this modification being for the purpose of enabling the removal of the column from the top of the condenser, Figure 11 is an axial section showing an alternative design of column, Figure 12 is an axial vertical section through an alternative simple or single-chambered condenser according to the invention, in which only one column is employed, Figure 13 is a vertical axial section, partly in elevation, through an alternative form of condenser having three vapor zones, an adjacent part of a chamber adjacent thereto being shown.

In the form of ejector condenser shown in Figures 1 to 6, a shell or body 1 of generally elongated shape is provided, and although such shell in use is intended to be swung into a substantially horizontal clean-out position as will be hereinafter described the upper part of the shell as shown in Figures 1 and 5 will be referred to hereinafter as its upper end, and the lower part will be referred to as its lower end.

The shell 1 is tapered towards its upper and lower ends, the lower tapered part being longer than the upper tapered part, and is preferably made of stainless steel which is preferably highly polished, the inner surfaces being made as smooth, continuous and uninterrupted as possible for hygienic reasons.

As the condenser is intended for use in the generation of two separate zones of vacuum or negative pressure, the shell 1 contains a partition 1a which is of general stepped or Z-shape and extends across the interior of the shell so as to divide the said interior into upper and lower high and low vacuum zones 2 and 3 respectively. Two vapor inlets 2a and 3a are provided at opposite sides of the shell 1, with their common axis transversely disposed relatively to the said shell, and the stepped partition 1a is so arranged that, notwithstanding the fact that the said inlets are in line, one inlet is associated with one of the said zones, and the other inlet is associated with the other of said zones.

In the construction shown, the common axis of the vapor inlets passes approximately through the center of the substantially vertical part of the stepped partition.

On the upper and lower ends of the shell 1 are provided top and bottom cover or end members 4 and 5 respectively, said covers or end members being held in place in such a way as to ensure accurate setting up of the condenser. For this purpose, referring to Figure 6 wherein is shown the lower joint between the shell 1 and the bottom cover or end member 5, a metal ring 6 is welded to or formed on the outside of the shell at a short distance from its end and a ring 7 is formed on the end member, and the shell extends almost to the end member. A rubber or the like sealing ring 8 is placed around the end of the shell, beyond the ring 6, and when the parts are brought together and the rings 6 and 7 are clamped together in metal-to-metal contact the rubber or the like ring is compressed to the requisite degree and the necessary seal is thus effected. Any suitable and known clamps can be employed for this purpose. A form of clamp which has been found to be most satisfactory is shown at 150 in Fig. 5 of the drawing. These clamps have been shown only in this one view for the sake of simplicity and so as not to obscure the construction as shown in the other figures. The upper joint is effected in the same manner. A dowel is carried by one of the rings and engages a hole 10 in the other ring in order to properly locate the parts.

Lengthwise within the shell are provided two assemblies 10 and 10a of throated members, hereinafter referred to as columns or passageways, made preferably of stainless steel machine finished and polished for hygienic reasons. Each column consists of a plurality of throated members 11, 12, 13 and 14, the last mentioned constituting a tail pipe, said throated members being connected by tubular skirted sleeve members 15, 16, 17, 18 and 19 having apertures 20 therein, and the construction being such that when assembled the apertures 20 are staggered alternately at right angles throughout the length of the column in order to give the desired rigidity.

The throated members and the sleeve members are secured together by screwing, as shown at 21 in Figures 2, 3 and 4, unless it is desired to provide for the removal of each column in a number of sections, in which case one or more of the joints between the sleeve members and the throated members is made a tapered push fit as shown at 22 in Figure 3. In either case the entire column, or each section thereof as the case may be, forms a rigid and properly aligned assembly which can be readily dismantled for clean-out purposes and with equal readiness reassembled for reuse.

Each column is held in position by end pressure applied from below, and is removable downwards through the lower end of the shell, the upper section of each column being optionally removable if desired from the upper end of the shell in the event of the column being made in sections with a tapered joint as shown in Figure 3.

The upper end member 4 has two internally threaded bosses 23 and 23a into which are screwed the necessary water nozzles 24 and 24a which are tapered towards their lower ends in order to facilitate the upward movement of the column thereonto, the upper edge of the uppermost sleeve member 15 being internally chamfered or rounded in order to assist assembling. The water nozzles 24 and 24a and the associated upper sleeve members 15 are fitted together in such a way as to properly align the columns with the said water nozzles 24 and 24a. It is not considered necessary to employ resilient sealing means at the upper ends of the columns.

Referring to Figure 4, the tail pipes 14 at the lower ends of the columns pass through holes in the lower end member 5 and extend below the same, the enlarged portions 14a of the tail-pipes fitting normally within the said holes. The parts 14b below the enlarged portions 14a of the tail pipes are tapered to facilitate assembling, and shoulders 25 are provided at the lower ends of the columns, resilient rubber or the like sealing rings 26 being clamped between the said shoulders and the lower end member 5.

In order to effect a seal between the two zones 2 and 3 and yet enable ready dismantling and reassembling when desired, a resilient rubber or the like sealing ring 27 is carried by each column, each such ring being engageable under compression with the inner periphery of an upwardly tapered conical metallic seat 28 associated with the partition 1a between the upper and lower vapor zones 2 and 3, the taper of the seats being such as to permit removal of each column through the lower end of the shell, the sealing rings 27 disengaging the said seats. The rings 27 are carried in grooves 29 provided around the columns between the sleeve members 17 and 18 and around the throated member 13, as shown in Figure 3.

On the top of the upper end member 4 there is provided a water header or dome 30 from the interior of which the water nozzles 24 and 24a are supplied, said header or dome having an upwardly projecting boss 31 thereon for attachment to a suitable source of water supply. The provision of such header or dome tends to equalize the water pressure between the nozzles 24 and 24a.

The lower end member 5 has formed thereon a downwardly projecting sleeve 32 adapted to be associated with a funnel 33 slidably or telescopically associated with a drain 34, in order to prevent or minimize escape of odours into the room and yet facilitate disconnection of the condenser from the drain when desired. Resilient rubber or the like seals 35 and 36 are appropriately provided between the sleeve 32 and the funnel 33 on the one hand and between the funnel stem and the drain 34 on the other hand.

A relief valve 37 consisting of a hinged flap valve seating on a rubber or the like seat is provided for the purpose of disposing of excess water from the upper zone 2 in the unlikely event of the upper zone becoming choked, for example, in the event of water supply pressure dropping unduly, said flap valve in such unlikely circumstances opening on the operating vacuum being destroyed, so as to discharge any water which might accumulate, and so avoid the development of pressure within the said zone.

A boss 38 is provided on the front of the shell for the purpose of receiving a snifter or pressure reducing valve 38a, Figure 5, which is provided to limit the degree of vacuum in the lower zone 3. Vacuum temperature gauges 39 and 39a are associated with the respective vacuum zones of the condenser.

There are no external projections on the columns, and for practical purposes the external surface of each column is substantially smooth, continuous and uninterrupted throughout the length of such column, which facilitates withdrawal and reinsertion of the column without damaging the said column or contiguous parts of the condenser through which it is passed. The above feature, and also the simple and effective smooth internal shape of the component parts of the column enables hygienic conditions to be readily maintained, while the proper flow of water through the column is facilitated.

The apertures 20 form a means of ingress for the vapors and gases in the two vapor zones to the water jets passing through the columns.

The columns function in the same way as the cone assemblies in known types of ejector condensers, but can be readily inserted and removed from the shell. The manner in which the columns 10 and 10a, the top and bottom end members or covers 4 and 5, the partition 1a and the sealing means 26 and 27 are associated facilitates positioning of the columns in the proper manner within the shell 1, and ensures proper sealing of each vapor zone 2 or 3 from the other zone and from the surrounding atmosphere, the lower end member 5 being employed to apply the necessary pressure to hold the columns in place with the sealing means 26 and 27 compressed to the requisite degree.

By the use of two columns as above described and shown in the drawings the operation of the condenser is more readily variable than where only one column is employed. For example, if three sizes or capacities of columns and three nozzle sizes are employed, then for any given pressure and temperature of water flow, six different vacuum capacities can be obtained by the selection of appropriate combinations of column sizes, and corresponding nozzle sizes, thus, while the condenser is dismantled, its effective capacity can be adjusted as desired for the next period of use.

A further advantage of using two columns is that the combined circumferences of the two jets is greater than the circumference of a single jet of the same volumetric capacity. Consequently, a larger condensing surface is made available and more efficient heat absorption is obtained. There is also a much greater entrainment area for the gas entering the final throat of each column. Greater efficiency is consequently obtained for a given volumetric capacity.

The vapor inlets 2a and 3a are provided with annular flanges or rings 40 and 40a of such a design as to provide for coupling to the rest of the apparatus and yet permit ready pivoting or rotation of the shell 1 about the common axis of said inlets as will be more fully described hereinafter.

The foregoing disclosure has been directed primarily to the ejector condenser itself. The present invention is however also concerned with the relation of such ejector condenser to the rest of an apparatus with which it is associated.

While a condenser according to the present invention can be applied to various types of apparatus for varying purposes, reference will now be made to Figures 7 to 9 wherein is shown the condenser as described with reference to Figures 1 to 6 in combination with a vacuum pasteurizing and steam distilling apparatus wherein different degrees of vacuum are maintained in operation.

In such apparatus a pasteurising chamber 43 operating at a low degree of vacuum, a steam distilling chamber 44 operating at a higher degree of vacuum, and a further or second steam distilling chamber 45 operating at a still higher degree of vacuum, all function in a manner which is well-known in this class of apparatus. The said sections are however especially arranged in a manner which will be more clearly understood by reference to Figure 7 so as to accommodate the condenser which is shown by the reference 46.

The condenser 46 is carried between the vapour pipes or elbows 44a and 45a at the top of the respective steam distilling chambers 44 and 45 respectively, so as to permit pivoting or rotation of the condenser about the common transverse axis of the upper parts of the vapor pipes or elbows 44a and 45a, said axis being coincident with the common axis of the condenser vapor inlets 2a and 3a.

The pivoting of the condenser is illustrated in Figure 8 in which the substantially vertical operative position of the condenser is shown in full lines while the substantially horizontal cleanout position is shown by broken lines. This pivotal mounting of the condenser is particularly advantageous where the equipment is of large size and would otherwise be difficult to handle.

The vapor pipes or elbows 44a and 45a are detachably clamped to the vapor inlets 2a and 3a of the condenser, and for this purpose at the ends of the vapor pipes or elbows adjacent to the condenser there are provided clamping flanges or rings 44b and 45b adapted to be clamped by any suitable and known form of clamps to the flanges or rings 40 and 40a carried by the vapor inlets of the condenser. A compressible sealing ring is employed in a similar manner to the compressible sealing rings employed to seal the upper and lower end covers on to the condenser shell. In order to allow for a degree of latitude in the spacing of the chambers 44 and 45 one of the rings or flanges 40 and 40a (Figures 5 and 9) may freely mounted on its vapor inlet instead of being secured thereto.

Reference will now be made to Figure 9 of the drawings. The vapor pipes or elbows 44a and 45a are also clamped to two lids 44c and 45c on the upper ends of the chambers 44 and 45 by means of pivotal yokes or stirrups 46 and 47 hinged respectively at 46a and 47a to suitable bosses on the respective chambers 44 and 45, the upper parts of the stirrups coacting with cam or latch projections 48 and 49 on the elbows to removably secure the elbows on the said lids and enable them to be readily removed for cleaning purposes and to further facilitate pivoting of the condenser. Sealing means comprising rings or flanges 50 and 51 fixed to the vapor pipes or bends and associated rubber or the like rings 50a and 51a are provided between the vapor pipes or bends and the lids, while sealing means comprising swages 52 and 53, loosely fitting metal rings 52 and 53a, and rubber or the like sealing rings 52b and 53b are provided between the lids 44c and 45c and the chambers 44 and 45.

The vapor inlets 2a and 3a of the condenser are of a diameter sufficiently larger than that of the vapor pipes or elbows 44a and 45a to provide for a pair of one-way flap valves 41 and 42 swung on hooks 41a and 42a in the vapor inlets 2a and 3a to seat on rubber or the like sealing means carried by inner rings 54 and 55 at the end of the vapor pipes or elbows 44a and 45a. The said flap valves act as seals so that should a break occur in the operating vacuum there will be no substantial backward flow of vapor through the vapor pipes or elbows to the rest of the apparatus. In this manner, substantially effective security is achieved against break of vacuum in the chambers 44 and 45.

To support the condenser from the chambers 44 and 45, two vertically adjustable supporting yokes 56 and 57, Figures 8 and 9, are adapted to engage beneath the vapor inlets 2a and 3a of the condenser so as to support the latter irrespective of its pivotal position. The said yokes 56 and 57 are adjustably attached to the exterior of the chambers 44 and 45 at 56a and 57a. A curved connection stop bar 58 extends between the mountings 56a and 57a for the dual purposes of staying the chambers 44 and 45 and engaging the back of the lower part of the condenser so as to limit the pivotal movement of the said condenser in its return to operative position after cleaning out thereby properly locating the condenser in such operative position.

For the purpose of supporting the condenser in the substantially horizontal clean-out position shown by broken lines in Figure 8, a curved rest 59, shown in Figure 7 and also shown by broken outline in Figure 5, is hinged at 60 to a bearing 61 on the pasteurizer casing and can be swung from the inoperative position shown in full lines in Figures 7 to the operative position shown by broken lines in such figure. When the rest is in the inoperative position the condenser can be swung from its operative substantially vertical position to a substantially horizontal position, whereupon the rest can be swung into position and the condenser lowered thereonto.

The water supply connection to the condenser is of a type which can be readily disconnected from the condenser inlet to allow swinging of the condenser for cleanout operations but which will be held tightly in place under leak-proof conditions during operation, such connection comprising a union connection 62, Figure 8, between the condenser inlet 63 and the water line 64.

Referring to Figure 8, the drain pipe 34 from the funnel 33 is taken through the floor or in any suitable way to a convenient outlet. Downward movement of the funnel permits pivotal movement of the condenser from its operative position.

A thermometer 65 is conveniently mounted on the drain pipe 34 and a tell-tale drip-cock or vent 66 is provided. In Figure 7 is shown a manual control 67 for the valve which is provided between the chambers 44 and 45.

Much of the details of the vacuum pasteurising and steam distilling apparatus has been omitted for clarity, but in all essential respects the apparatus follows known practice and it will be obvious to any person skilled in the art what further provision is required to be made in order to make the apparatus operable.

The operation of the invention will now be described.

In order to dismantle and clean out the condenser and its allied parts, the pivoted stirrups 46 and 47 are unlatched from the cam or latch projections 48 and 49 and are swung over out of the way, about their hinges 46a and 47a. The clamping means like that shown in Fig. 5 holding together the rings or flanges 44b and 40 and the rings 45b and 40a are now removed and the vapor pipes or elbows 44a and 45a are also removed. Upon removal of the said vapor pipes or elbows the flap valves 41 and 42 are removed.

The union connection 62 to the water pipe line 64 is now released and the funnel 33 is telescoped to the desired degree within the drain pipe 34.

The condenser can now be swung into the substantially horizontal clean-out position, the support or rest 59 being swung into position and the condenser supported thereon. The condenser is now ready for the removal of the bottom cover plate 5 so that the columns can be removed for cleaning, scrubbing and scouring. By removal of the top plate or cover 4 in like manner all interior surfaces of the condenser can be readily washed out or otherwise cleaned through the openings thus provided.

The lids 44c and 45c can be removed at any convenient time.

Once cleaned, the apparatus is ready for reassembly. The top cover 4 is replaced, the new thoroughly cleaned columns are inserted, and the lower end cover 5 is replaced, whereupon the rest 59 can be swung out of the way and the condenser can be swung to its substantially vertical operative position, such movement being limited and the operative position of the condenser being determined by the condenser bearing against the stop bar 58. The water supply union 62 is now again coupled up, the funnel 33 is brought to its operative position, the lids 44c and 45c and flap valves and vapor elbows or pipes 44a and 45a are replaced, the stirrups 46 and 47 are locked in place and the various clamps (see Fig. 5) are applied to secure the joints in the vapor supply lines to the condenser.

While the condenser is dismantled, the columns can if desired be replaced with columns of any other desired capacities so that when reassembled the condenser, by the resulting readjustment of the volume of water flowing through the columns, can be closely adjusted for the most efficient and economical operation for the particular purpose for which the condenser will next be used.

For normal cleaning purposes it is unnecessary to remove the condenser bodily from the apparatus. However, should this be desirable for any reason, upon removal of the vapor pipes or elbows and detachment of the water supply union the shell can be lifted bodily from the top of the yokes 56 and 57 on which it is freely mounted.

In the embodiment of the invention hereinbefore described, removal of the columns from the end of the shell which in use is the lower and has been set out, this being considered to be the most advantageous arrangement in most cases, and particularly where the apparatus of which the condenser forms a part is situated or erected close to and backing upon a wall, in which case it may not be possible or convenient to remove the columns from the opposite end. However, should it be more convenient in any particular case to provide for removal of the column or columns from the upper end, this can be provided for in various ways, one way being shown in Figure 10. In this modification, the seat 71 for the sealing ring 27 is simply of reversed design, with the inner surface of the seat tapered downward instead of upwards. In such case, each column has a tapered shoulder 71a in which to accommodate the ring 27 so that the high vacuum will not overcome the seal.

In the modified construction of throated members shown in Figure 11, each throated member has a nozzle portion 72, a conical part 73 thereabove, and a cylindrical apertured part 74 above the part 73, said cylindrical part being adapted to screw onto the threaded part 75 of the throated member next above.

The invention can also be applied to a single jet condenser of either the compound or simple form, or to a simple condenser having multiple jets, or to a compound condenser having more than two jets, the necessary modifications being obvious to any person skilled in the art. Further, the ejector condenser herein described and shown could readily be adapted to provide more than two independent vapor zones, as will be hereinafter described.

In order to show the application of the invention to a simple condenser of the single-jet type, Figure 12 has been included.

In the construction shown in Figure 12, no partition is required as in the construction shown in Figures 1 to 6, nor is a middle seal employed. In this embodiment, as only one vapor inlet 69 is required, the other inlet is dispensed with and instead is provided a stub-axle 68 projecting outwards from the condenser shell and disposed in line with and axially coincident with the vapor inlet 69 so as to serve as an axle to pivotally support one side of the condenser during swinging from operative to clean-out position and vice versa. A bearing 70 is provided for the axle. In this modification, the entire vacuum zone is continuous and uninterrupted and a single degree of vacuum is generated within the condenser shell. In other respects this condenser is similar to that shown in Figures 1 to 6, the housing is jointed and assembled in a similar manner, the column is removable in a similar manner, the lower column seal is effected in a similar manner and the column construction is similar. Like references indicate like parts of the column. No header or dome 30 or lower sleeve 32 are employed as in Figures 1 and 5.

In this construction, a relief flap valve similar to the relief flap valve 37 in Figure 1 is provided as low as possible in the vapor zone.

In the modified form of condenser shown in Figure 13, there are provided three vapor zones 82, 83 and 84, the zone 82 being the zone containing the highest vacuum, and the zone 84 containing the lowest vacuum.

The upper two zones 82 and 83 are separated and sealed one from the other in the same way as are the zones 2 and 3 in the construction shown in Figures 1 to 5, and the zones 83 and 84 are separated by a horizontal partition 85 carrying seats 86 of enlarged internal diameter to permit the passage of the sealing rings 87 and yet coact with sealing rings 88 carried in grooves 89 in the columns or passageways, the columns or passageways being externally enlarged in the part carrying the grooves 89 in order to provide for the large size of the sealing rings 88 which is made necessary by the large diameter of the seats 86.

The vapor inlets to the upper two zones are the same as in the construction shown in Figures 1 to 5, but the lowest zone 84 is operatively connectable to a chamber, shown diagrammatically at 94, by means of a branch 95 projecting from the back of the shell and connectable to a branch 96 on the chamber 94, the joint being made in the same manner as the joints on the two upper vacuum inlets.

Only the upper zone 82 is provided with a flap valve 90, but the two lower chambers are provided with bosses 91 and 92 for connection to the necessary snifter valves to control the degrees of vacuum existing therein, while a further boss 93 is provided to mount a vacuum temperature gauge for the lowest zone, the upper two zones being provided with gauges attached to bosses one of which is shown at 100, in the same way as is shown in Figure 5.

The top and bottom covers and joints therefor and associated parts are contructed substantially as shown in Figures 1 and 5. An intermediate joint is provided in the shell at 99 to facilitate cleaning of the intermediate zone.

In the operation of the form of the invention shown in Figure 13, upon detachment of the parts 95 and 96, the condenser is swung in the direction of the arrow 97 into its substantially horizontal position. Upon removal of the bottom cover 98 the columns or passageways can be withdrawn through the bottom of the shell. When returned the shell is located in its operative position by the joint between the parts 95 and 96, the joint being secured by clamps such as shown in Fig. 5.

Alternatively, a joint such as the joint 22 (Figure 3) is provided in each column or passageway, within the zone 83, and the upper partition seal is effected as in Figure 10, part of each column being removable from the top opening of the shell and a part being removable from the bottom opening thereof.

I claim:
1. As an element of an ejector-condenser, a stack of cones comprising a plurality of cone members engaged together so as to provide substantially smooth, uninterrupted and continuous internal and external surfaces, each said cone member comprising an upper, cylindrical sleeve portion of enlarged diameter open at one end and internally adapted at said open end for the reception of the next overlying cone member, and having in the sleeve portion thereof a plurality of vapor inlets, a tapering inverted cone portion secured at its base to the bottom of said sleeve portion and being appreciably smaller in external diameter at its base than the external diameter of said sleeve portion to an extent sufficient to provide at its junction therewith a peripheral shoulder for the reception of the annular terminal edge defining the open end of the sleeve portion of the next underlying cone member, said cone portion, at its upper end, being externally adapted so as to engage for a short distance into the internal longitudinal peripheral extent of the sleeve portion of the next underlying cone member, and the small diameter end of said cone portion terminating in a cylindrical nozzle portion which fits into the cone portion of the next underlying cone member, but terminates short of the wall thereof.

2. A vacuum pumping assembly comprising an ejector condenser divided into two separate vacuum zones and including an outer shell having means defining transversely and diametrically opposed and outwardly projecting vapor inlets disposed intermediate the length of said shell, one such inlet for each said zone, said condenser further including a jet assembly disposed longitudinally within and in annularly spaced relation to said shell and extending through each vapor zone, said outwardly projecting inlets comprising paired trunnion means, which together serve to facilitate bodily swing of said condenser; two separate elements to be evacuated; vapor pipes operably connecting said elements, one to each said vapor inlet of the condenser; yoke means on each said element, co-operating with each other, and pivotally mounting said condenser by said trunnion means to support the same for swinging through a vertical angle about the transverse center line through said vapor inlets of the condenser; ready means for locking the vapor pipes to said elements to be evacuated and ready means for locking the vapor pipes to the vapor inlets, so that the condenser can be swung through a vertical angle about said trunnion means; and means extending between said elements to be evacuated, for aligning the condenser when it has been swung back into its operable condition.

3. A vacuum pumping assembly according to claim 2 for use in operable connection with and while energized by a water supply pipe, and said jet assembly further comprising at least one passageway of spaced throated members extending through the complete length of said condenser, and wherein said condenser further comprises inlet and outlet closure members readily attachable to said outer shell, said vacuum pumping assembly including ready means extending between said associated water pipe and the inlet closure member of said condenser, for readily clamping together and unclamping the water pipe and inlet closure member; release of the three ready means, removal of the closure members, and swinging of the condenser about the trunnion means at the vapor inlets permitting ready access to the interior of the condenser for clean-out purposes.

4. In an ejector-condenser, an outer shell having at least one vapor inlet disposed intermediate its length for attachment of the ejector-condenser to an element to be exhausted thereby, and means tending effectively to seal said last mentioned element against atmospheric encroachment through said condenser upon accidental failure of vacuum therein, said means comprising a one-way valve hinged to said inlet and adapted to open inwardly within said shell upon production of vacuum therein, and to fall into closed position, closing said inlet, upon failure of the vacuum within said shell, thereby preventing a suck-back into the associated element to be evacuated.

5. An ejector condenser for ready dismantling and cleaning, comprising an open-ended shell, smooth, regular, continuous and unbroken in transverse cross-section and having a vapor inlet intermediate its length; top and bottom closure members for said shell, adapted to be clamped to the respective ends of said shell; sealing means provided between each of the top and bottom closure members on the one hand, and the shell, on the other hand; an inlet nozzle in said top closure member; a jet assembly in said shell and comprising a unitary, elongated column comprised of a plurality of means providing apertured sleeve portions and nozzle portions, said last-mentioned means being physically contiguous and mutually supporting and alternating with each other within said column, the bottommost, outlet nozzle portion projecting exteriorly through a corresponding opening in the bottom closure member; and positioning means in said top closure member for positioning said jet assembly, said assembly abutting, by the outlet nozzle portion, against the bottom closure member and being positioned by said positioning means and being firmly held between said top and bottom closure members, upon and solely as an incident to clamping said closure members to said shell.

6. An ejector condenser for ready dismantling and cleaning, comprising an open-ended shell having a vapor inlet intermediate its length; top and bottom closure members for said shell adapted to be readily clamped to corresponding ends of said shell; sealing means provided between the top and bottom closure members on the one hand, and the shell, on the other hand; an inlet nozzle on said top closure member with a nipple portion projecting interiorly of said shell; a jet assembly comprising a unitary, elongated column formed of a plurality of apertured means providing alternating sleeve portions and nozzle portions, the several elements of said plurality of last mentioned means being physically contiguous and mutually supporting within said column, the bottommost, outlet nozzle portion being shouldered and projecting exteriorly through a corresponding opening in the bottom closure member; said jet assembly being positioned by the nipple portion of the inlet nozzle and abutting against the upper closure member and, by the shoulder of the outlet nozzle portion, against the bottom closure member; and sealing means provided between said jet assembly and said bottom closure member; the jet assembly being positioned and firmly held by said closure members, and all sealing means being compression-urged into sealing position upon and solely as an incident to clamping said closure members to said shell.

7. An ejector condenser for ready dismantling and cleaning, comprising an open-ended shell, regular and unbroken when viewed in transverse cross-section, and having a vapor inlet intermediate its length; top and bottom closure members for said shell, sealing means interposed between both top and bottom closure members on the one hand, and the corresponding ends of said shell, on the other hand; a plurality of clamping means, each readily engaging both an associated closure member and the shell in the region of said closure member and being readily detachable therefrom, said clamping means readily clamping the closure members to the respective ends of said shell; a jet assembly, comprising a plurality of means providing a unitary, elongated column of physically contiguous, contacting and mutually-supporting sleeve portions and nozzle portions, alternating with each other within said column, the said jet assembly having a plurality of openings therein between the interior of the shell and the interior of the jet assembly, the bottommost, outlet nozzle portion of the assembly terminating in an elongated nozzle extending exteriorly through a corresponding opening in the bottom closure member, an inlet nozzle in said top closure member serving as a positioning means for aligning said jet assembly relative to said inlet nozzle, said jet assembly abutting the upper and lower closure members, and being positioned and firmly held thereby, in alignment with said inlet nozzle, upon and solely as an incident to clamping said closure members to said shell.

8. An ejector condenser for ready dismantling and cleaning, comprising an open-ended shell, circular in cross-section and having a vapor inlet along its longitudinal extent; top and bottom closure members for said shell; sealing means interposed between said top and bottom closure members, on the one hand, and the corresponding ends of the shell, on the other hand; a plurality of clamping means, each readily engaging both an associated closure member and the shell, and readily detachable therefrom, said clamping means readily clamping the closure members to the respective ends of said shell; an inlet nozzle in said top closure member and having a nipple portion projecting interiorly of said shell; a jet assembly comprising a unitary, elongated and in assembly, monolithic column, and comprising a plurality of means providing physically contiguous and mutually-supporting sleeve portions and nozzle portions alternating with each other within said column, said jet assembly having a plurality of openings therein between the interior of the shell and the interior of the jet assembly; the bottommost, outlet nozzle portion terminating in an elongated and shouldered nozzle projecting exteriorly through a corresponding opening in the bottom closure member; said jet assembly abutting against the nipple portion of the inlet nozzle at the upper closure member and, by the shoulder of the outlet nozzle portion, against the bottom closure member, and being positioned and firmly held thereby, upon and solely as an incident to clamping said closure members to said shell.

9. An ejector condenser capable of being readily dismantled and cleaned, comprising an open-ended shell, smooth, regular, continuous and unbroken in transverse cross-section throughout its length and having vapor inlets along its longitudinal extent, a transverse partition disposed across the interior of said shell and dividing the same into separate chambers; there being a separate vapor inlet in said shell for each said chamber, top and bottom closure members for said shell and adapted to be readily clamped thereon; an inlet nozzle in said top closure member and having a nipple portion projecting interiorly of said shell; a jet assembly comprising a unitary, elongated and monolithic column comprised of a plurality of means defining physically contiguous, contacting, and mutually-supporting sleeve portions and nozzle portions alternating with each other within said column, the bottommost and outlet nozzle portion terminating in an elongated outlet nozzle projecting exteriorly through a corresponding opening in the bottom closure member said assembly passing through a shouldered opening in said partition; said nipple portion of said inlet nozzle acting in assembly as a positioning stud to align said jet assembly operably relative to said inlet nozzle; and compression seals disposed between each said closure member and said shell, and between the jet assembly on the one hand and both said partition and said bottom closure member on the other hand, said jet assembly being positioned and firmly held thereby, in alignment with said inlet nozzle, and said compression seals being compressed, upon and solely as an incident to clamping said closure members to said shell.

10. In a vacuum processing assembly having cooperating trunnion-supporting mounts, an ejector-condenser, capable of being readily dismantled and cleaned, comprising an open-ended shell continuous in cross-section; a transverse partition substantially Z-shaped in section dividing said shell into two separate vapor chambers, said shell having paired, sleeve-like vapor inlets, one for each chamber, diametrically and co-axially opposite each other intermediate the ends of said shell, and adapted to be removably clamped to the chambers to be evacuated, the sleeve-like vapor inlets, along the intermediate portions of their extent, serving as trunnions for cooperating with the corresponding trunnion-supporting mounts, for mounting said shell for rocking through a vertical angle into clean-out portion; and a jet assembly comprising a unitary, elongated column made up of a plurality of means defining physically contiguous, contacting and mutually-supporting apertured sleeve portions and nozzle portions alternating therein, compression-mounted between said closure members and passing through said partition, said partition being apertured for such purpose, and being firmly held by said closure members, upon and solely as an incident to clamping said closure members to said shell.

11. As a part of an ejector condenser, a jet assembly comprising a plurality of means defining apertured sleeve and nozzle members alternating with each other said plurality of means being tightly secured together in operable and chain-like assembly in physically contiguous and mutually-supporting manner, certain of the said plurality of means, adjacent each other, having mutually tapered and coacting edge-abutting portions, providing therebetween a smooth, regular, continuous and sliding fit, thereby adapting them for compression-wedging together upon assembly of the condenser, for ready dismantling of the assembly upon dismantling the condenser.

12. As part of an ejector-condenser, an ejector cone comprising in superposed continuity, beginning from the top when viewed in vertical disposition, a generally cylindrical sleeve portion serving as a spacing element and having at least one vapor inlet provided laterally thereinto, in its side, intermediate its length, an inverted conical throat-portion joined at its base to said sleeve portion and appreciably smaller in external diameter at its base than the external diameter of said sleeve portion to an extent sufficient to provide at its junction therewith an undercut, external and peripheral shoulder, and a cylindrical nozzle portion of small internal diameter approximating that of the apex-end of said conical throat-portion, to which it is joined.

13. As part of an ejector-condenser, an ejector cone assembly comprising a plurality of cones, in which assembly each cone comprises a generally cylindrical sleeve portion serving as a spacing element, an inverted conical throat portion joined at its base to said sleeve portion and appreciably smaller in external diameter at its base than the external diameter of said sleeve portion to an extent sufficient to provide at its junction therewith an external, peripheral and outwardly-extending shoulder, free and unobstructed on its undercut or underside; a cylindrical nozzle portion of small internal diameter approximately that of the apex end of said conical throat portion to which it is joined, at least one vapor inlet being provided in the side of each sleeve portion, intermediate its length, said cones being provided in a series of like cones disposed in nested superposed relation, the one cone overlying the other when viewed in vertical arrangement, wherein the uppermost, free end of the sleeve portion of each cone, remote from the corresponding throat-portion, is internally threaded for the reception of the next overlying cone, and the throat-portion being externally threaded along its length in the region of its base, for threadedly engaging within the sleeve portion of the next underlying cone, the free underside of the undercut peripheral shoulder abutting, in assembly, the free edge of the sleeve portion of the next underlying cone.

14. In a vacuum processing assembly which includes cooperating trunnion-supporting mounts as an integral part thereof, an ejector-condenser capable of being readily dismantled and cleaned, comprising in combination, a shell circular in cross-section; a first, apertured closure means at one end of said shell; a second, apertured closure means for the other end of said shell, removably clamped thereto; a unitary, centrally and longitudinally bored and laterally apertured jet structure disposed in said shell for ready removability therefrom and in spaced relation therewith throughout the length of the shell; said jet structure being clamped and compression-held between said apertured closure means when the removable closure means is operably positioned on said shell, and the lower end of said jet structure projecting through and beyond the aperture in that one of the first and second closure means which is lowermost in assembly; and positioning means on the uppermost one of said first and second closure means and cooperating with the upper end of said jet structure to align the central bore of the latter with the apertures of the first and second closure means when the condenser is assembled; said shell having a vapor inlet disposed intermediate its length; and paired trunnions on said shell, of which said vapor inlet comprises one, whereby said condenser can be carried on said trunnion-supports, for rocking through a vertical angle, for clean-out.

15. As part of a vacuum processing assembly, including a plurality of cooperating trunnion-supporting mounts, an ejector-condenser which can be readily dismantled and cleaned, comprising in combination, a shell continuous in cross-section; a first apertured closure means at one end of said shell; a second apertured closure means for the other end of said shell, removably clamped thereto; ready means for quickly and removably clamping said second closure means to the corresponding end of said shell; a unitary and removable, centrally and longitudinally bored and laterally apertured jet structure disposed in said shell in spaced relation thereto throughout the length of the shell, and clamped and compression-held between said first and second apertured means when the second apertured means is operably positioned on said shell; and positioning means in said ejector-condenser, of which means said jet structure comprises part, and operable on said jet structure, upon assembly of the condenser, to align the central bore of said jet structure with the apertures of the said two closure means; and paired and diametrically opposed, co-axial vapor inlets serving as support trunnions letting into and projecting from said shell intermediate its ends, and cooperating with the said trunnion-supporting mounts to enable rocking said shell through a vertical angle, into clean-out position.

16. In a continuous vacuum processing assembly, an ejector condenser for evacuating allied vacuum parts of said assembly and itself capable of ready dismantling for cleaning; comprising a shell; a first apertured closure means at one end of said shell; a second apertured closure means for the other end of said shell, removably clamped thereto; a partition, substantially Z-shaped in section, defining an intermediate and apertured yoke portion and a leg portion at each end of said yoke portion, said yoke portion being disposed longitudinally of said shell and thereby dividing said shell intermediate its length into two separate vapor chambers; a unitary and removable, centrally and longitudinally bored and laterally apertured, columnar jet structure comprising a suction column and disposed in said shell in spaced relation thereto throughout the length of said shell, and extending through and sealing against the yoke portion of said partition; said jet structure being clamped and compression-held between said first and second closure means and in sealed relation with said partition when said second closure means is clamped on said shell, the lower end of said jet structure extending through and beyond the aperture in that one of the first and second closure means which is lowermost in assembly; positioning means on the uppermost one of said first and second closure means and cooperating with the upper end of said jet structure to align the central bore of the latter with the apertures of the first and second closure means when the condenser is assembled; said shell having sleeve-like vapor inlets, one for each chamber, disposed diametrically and coaxially opposite each other along the length of the shell and adapted to be removably clamped to allied equipment to be evacuated; the said sleeve-like inlets serving as trunnions for rotating the shell through a vertical angle to clean-out position; corresponding yoke portions on said allied equipment to be evacuated for rotatably carrying said condenser and on which said trunnions are mounted; and means for supporting and steadying the shell in its clean-out position.

17. An ejector condenser for ready dismantling and cleaning, comprising a shell continuous in cross-section; a transverse and apertured partition in said shell and dividing it into separate vapor chambers; said shell having vapor inlets intermediate its length, one letting into each vapor chamber; a first apertured closure means at one end of said shell; a second apertured closure means for the other end of said shell, removably clamped thereto; an inlet nozzle letting at the top of said shell, into said first closure means through the aperture of the latter; a pressure dome disposed about said first closure means and having a liquid inlet therein; and a unitary, centrally and longitudinally bored and laterally apertured, columnar jet structure disposed for ready removal from and replacement within said shell, and extending through said partition and in spaced relation from said shell throughout the length of the latter; said jet structure being clamped and compression-held between said first and second apertured closure means when the second closure means is operably clamped on said shell; the bottommost part of said jet structure comprising an outlet nozzle portion which projects exteriorly through the corresponding opening of that closure means which is bottommost in assembly, said jet structure being disposed within said shell and abutting against the ends of the latter when the condenser is assembled and, intermediate its length, against said partition and being positioned in alignment with said inlet nozzle and firmly held in such position by, upon and solely as an incident to clamping said second closure means to said shell, a continuous liquid channel being provided through said pressure dome, the hollow jet structure, and the outlet nozzle portion of the latter.

18. In a vacuum-processing assembly, a readily dismantleable and cleanable ejector condenser, comprising a continuous-cross-sectioned shell; a first apertured closure means at one end of said shell; a second apertured closure means for the other end of said shell, and removably clamped thereto; an apertured partition disposed within said shell and dividing it into two separate vapor chambers; paired vapor inlets on said shell intermediate its length, one for each chamber, disposed diametrically and co-axially opposite each other, and each having a sleeve-like intermediate portion projecting laterally from said shell; associated and chambered apparatus disposed for evacuation by said condenser; ready means for readily and quickly removably clamping said vapor inlets to the portions of said associated and chambered apparatus which define the chambers thereof, the intermediate projecting sleeve portions of said inlets serving as trunnions for mounting said shell upon said associated and chambered apparatus, whereby said shell can be rocked through a vertical angle into clean-out position; and ready and compression-clamped in said shell between said first and second closure means upon assembly of the apparatus; a unitary, centrally and longitudinally bored and laterally apertured elongated and columnar pressure-reduction jet structure disposed in said shell in spaced relation to the shell throughout the length of the latter, and passing through said partition; and positioning means in said ejector-condenser, of which means said jet structure comprises part, and operable on said jet structure, upon assembly of the condenser, to align the central bore of said jet structure with the apertures of the said two closure means.

19. An ejector-condenser comprising, in combination, a shell generally circular in cross-section; an apertured partition provided in said shell and dividing it into separate vapor zones, said shell having a vapor inlet for each vapor zone; a unitary, centrally and longitudinally bored and laterally apertured jet structure and comprising a suction-creating column, readily and removably disposed in said shell in spaced relation thereto throughout the length of the latter; said jet structure extending through the aperture of said partition in sealed relation thereto; a first apertured closure means at the bottom end of said shell; a second apertured closure means for the top end of said shell, removably and readily clamping tightly against said shell; and through which said second closure means a column of water can pass to said jet structure, said jet structure extending between said first and second closure means and being compression-stressed and supported between the ends of the shell upon and as an incident to clamping the second closure means to said shell; an effective seal between the jet structure on the one hand and the first and second closure means and said partition on the other hand being established upon clamping said second closure means to said shell; said second closure means including means for positioning said jet structure operably for proper reception into the central bore thereof, of said column of water, upon and as an incident to assembly of said condenser.

20. An ejector-condenser comprising a shell, a hollow jet structure extending through said shell; a transverse partition disposed across the interior of said shell and apertured for the passage of said jet structure; top and bottom apertured closure members adapted for ready and removable clamping to the ends of said shell, and serving when operably clamped to said shell, to compress therebetween and to hold said jet structure in operable position within said shell; said top closure member including, and extending through the aperture thereof, a fluid inlet operably registering in assembly with said jet structure to provide activating fluid therefor; sealing means provided between said jet structure and said partition in the region of the aperture of the latter and being squeezed, upon assembly of the condenser, to provide liquid-tight seal around the juncture of said jet structure and said partition, said sealing means thereby sealing said partition and thus providing independent vapor zones, in response to and as an incident to the longitudinal compression-stresses established upon assembly of the top and bottom closure members upon said shell and which stresses are exerted upon said jet structure; the activating fluid being exhausted from said condenser through the aperture in the bottom closure member.

21. An ejector-condenser of the type described comprising a shell open at at least one end; a longitudinally bored and laterally apertured jet structure extending longitudinally through said shell; a closure means for the open end of said shell and in assembly providing one end of said shell; a water inlet letting into said shell at the top end thereof in assembly, registering with the longitudinal bore of said jet structure; the jet structure being clamped in assembly between the ends of said shell when the condenser is assembled; a partition disposed transversely across the interior of the said shell intermediate its length and dividing it into two separate vapor zones, and having a lipped aperture for the passage therethrough of the jet structure, and sealing means operably disposed upon said jet structure and cooperating with the lip defining the aperture in said partition, for sealing the said partition and thus providing independent vapor zones upon and as an incident to the clamping of the jet structure between the ends of the shell when said closure means is closed upon the shell; said closure member having a fluid inlet registering with the inlet end of said jet structure upon assembly of said condenser, and the end of the shell opposite said closure means being apertured for the passage of water exhausted from the condenser.

22. An ejector condenser of the type described comprising a shell, a jet assembly extending longitudinally therethrough; a transverse partition having a lipped aperture therein for the passage of said jet assembly, disposed across the interior of said shell intermediate its length and dividing it into two separate vapor zones, and closure means for closing a corresponding end of said shell, said closure means cooperating with said jet assembly and as a result of an incidental to closure of said closure means upon the corresponding end of said shell, positioning and sealing said jet assembly in operable position within said shell by compression stresses; the lip of the partition defining said aperture being so formed, and sealing means being provided on said jet assembly and so cooperating with said lip, as to seal said partition and make the vapor zones independent of each other upon the application of the aforesaid compressive stresses to said jet assembly by said closure means, said closure means having a fluid inlet registering, upon assembly of the condenser, with the corresponding end of said jet assembly, for the passage of motivating fluid therethrough; and means defining a fluid outlet provided at the end of said condenser opposite to said fluid inlet, for the discharge of the condenser activating fluid.

23. In an ejector condenser of the type described comprising a shell; a first closure means for one end of said shell; a second, removable closure means for readily and removably clamping upon the other end of said shell and which end is uppermost in assembly, an inlet nozzle mounted in said removable closure means for the passage of activating fluid; a jet assembly extending longitudinally through said shell; said closure means having jet assembly-positioning means thereon; sealing means on said assembly providing liquid-tight seals with the shell when the jet assembly is operably mounted in the shell; means on said jet assembly cooperating with the said jet-assembly positioning means on said removable closure means in such manner that when said removable closure means is clamped upon its corresponding end of the shell, the jet assembly is thereby aligned in operable relation with said inlet nozzle, and is held between the closure means for said shell when the removable closure means is clamped to said shell; and an outlet defined in said first closure means for discharge of activating fluid from the condenser.

24. An ejector condenser comprising an outer shell having a vapor inlet intermediate its length and letting thereinto from the exterior; top and bottom apertured and removable closure members for said shell; a fluid inlet extending through the aperture of said top closure member; means readily engaging each said closure member and the corresponding end of said shell for readily securing the same together, and being readily detachable therefrom; the said shell and closure members in assembly comprising a vapor chamber to be evacuated; a plurality of generally hollow conical members disposed concentrically in a stack within said shell and in annularly spaced relation to said shell, and comprising a jet structure for evacuating said vapor chamber; said stack of generally conical members presenting a substantially smooth, unbroken, continuous and uninterrupted exterior surface, and said stack having a plurality of openings therein communicating between the hollow interior of said stack and said annular space, the bottom generally conical member of said stack extending through the bottom of closure member of said shell and comprising an outlet to the exterior; said closure members and said stack of generally conical members cooperating, through said fluid inlet and the said outlet to the exterior provided by said bottom generally conical member, to position automatically said stack of generally conical members for supporting the same in operable position within said shell as an incident to clamping the closure members to the shell; and said stack of generally conical members being clamped between said top and bottom closure members upon and as an incident to clamping the latter upon said shell.

25. An ejector condenser comprising a hollow casing; a first closure means at one end of said casing, an apertured partition provided interiorly of said casing and dividing it into separate and independent vapor zones to be evacuated; said casing having an opening from the exterior into each vapor zone; a longitudinally and centrally hollow, readily removable and replaceable jet structure provided within said casing but operably free of direct contact with and direct support from the casing itself, and extending through said partition in sealed relation therewith; said jet structure comprising, for each separate vapor zone, the functional equivalent of at least one generally cylindrical apertured element opening into the corresponding vapor zone, and a cooperating and complementary, substantially conical throated element operably connected in series to said cylindrical element; said jet structure providing for the passage through the condenser of a vacuum-creating fluid; a second closure means readily and removably clamping on the other end of said casing and between which first and second closure means said jet structure is compression-held in operable position upon and as an incident to clamping said second closure means to said shell; and sealing means at said partition and said second closure means for sealing said jet structure in air and vapor-type manner when the condenser is assembled; removal of the second closure means freeing the jet structure, which is free of direct contact with and support from the casing itself, for ready removal from and replacement within the casing.

26. An ejector condenser comprising a hollow casing; a first, apertured closure means at one end of said casing; an apertured partition provided interiorly of said casing and dividing it into separate and independent vapor zones to be evacuated; said casing having an opening from the exterior into each vapor zone; a longitudinally and centrally hollow, readily removable and replaceable jet structure extending throughout the length of said casing in spaced relation thereto, and extending through said partition in sealed relation with the latter; said jet structure comprising several sections, at least one for each separate vapor zone, all said sections being operably connected together in assembly, and each section comprising at least one generally cylindrical apertured element opening into the corresponding vapor zone, and a cooperating and complementary, substantially conical throated element operably series-connected to said cylindrical element; the said jet structure permitting and guiding, and serving as conduit for, the passage through the condenser of a vacuum-creating fluid; a second closure means readily and removably clamping on the other end of said casing and between which first and second closure means said jet structure is compression-held in operable position within said casing upon and as an incident to clamping said second closure means to said casing; and sealing means between said partition and said second closure means for sealing said jet structure in air- and vapor-tight manner when the condenser is assembled, removal of the second closure means freeing the jet structure, which is free of direct contact with the support from the casing itself, and permitting ready removal in sections, of the jet structure from, and its replacement within, said casing.

References Cited in the file of this patent

UNITED STATES PATENTS

| | | |
|---|---|---|
| 2,314,455 | Murray | Mar. 23, 1943 |
| 2,378,425 | Murray | June 19, 1945 |

FOREIGN PATENTS

| | | |
|---|---|---|
| 575,697 | France | Aug. 4, 1924 |
| 849,896 | France | Dec. 4, 1939 |